United States Patent
Tucker

(10) Patent No.: US 7,360,780 B1
(45) Date of Patent: Apr. 22, 2008

(54) APPARATUS FOR HAND PROPULSION AND STEERING OF A SCOOTER, TRICYCLE OR BICYCLE

(76) Inventor: Joe W. Tucker, 702 Trimmier Rd., Apt. #4, Killeen, TX (US) 76541

( * ) Notice: Subject to any disclaimer, the term of this patent is extended or adjusted under 35 U.S.C. 154(b) by 0 days.

(21) Appl. No.: 11/893,924

(22) Filed: Aug. 20, 2007

(51) Int. Cl.
   *B62M 1/14* (2006.01)
(52) U.S. Cl. .................. 280/244; 280/242.1; 280/243; 280/246; 280/87.041
(58) Field of Classification Search ................ 280/244, 280/242.1, 243, 246, 87.041
   See application file for complete search history.

(56) References Cited

U.S. PATENT DOCUMENTS

| | | | | |
|---|---|---|---|---|
| 1,598,855 A | * | 9/1926 | Dunlop | ........................ 280/240 |
| 2,123,390 A | * | 7/1938 | Welch | ........................ 280/248 |
| 4,109,927 A | | 8/1978 | Harper | |
| 5,050,864 A | | 9/1991 | Pertramer | |
| 5,272,928 A | | 12/1993 | Young | |
| 5,282,640 A | * | 2/1994 | Lindsey | ....................... 280/234 |
| 5,690,346 A | * | 11/1997 | Keskitalo | ..................... 280/234 |
| 6,179,307 B1 | * | 1/2001 | Mao | ....................... 280/87.041 |
| 6,554,309 B2 | * | 4/2003 | Thir | ........................... 280/253 |
| 6,557,879 B2 | | 5/2003 | Caldwell | |
| 6,708,997 B2 | | 3/2004 | Chait | |
| 6,942,234 B1 | | 9/2005 | Chait | |

* cited by examiner

*Primary Examiner*—Lesley D. Morris
*Assistant Examiner*—Michael Stabley

(57) ABSTRACT

An apparatus is disclosed by means of which an operator both propels and steers a scooter, tricycle, or bicycle with a single set of handlebars. Power is applied by pumping the handlebars up and down, and steering is positive, and very similar to that of a conventional bicycle or tricycle. Drive means includes a single one-way clutch and a reciprocating endless chain or cable member which does not require a rewind spring. The total mechanism is very simple, the reciprocating components are few and light weight, and a long stroke yields a functional efficiency and top speed.

17 Claims, 3 Drawing Sheets

APPARATUS FOR HAND PROPULSION AND STEERING OF A SCOOTER, TRICYCLE OR BICYCLE

FIELD OF THE INVENTION

This invention is one in which the operator's hands furnish power to propel a wheeled vehicle and in which steering for the vehicle is provided, and more particularly, in which the hands operate a single set of handlebars which transfers motive power and also handles the steering.

Power is transferred by pumping the handlebars up and down, and steering is accomplished by twisting the handlebars around an approximately vertical axis, and is very similar to the steering of a conventional bicycle.

Power transfer utilizes a one-way clutch, which is common in the comparable art, along with an endless loop of a drive member which can be a chain, cable, strap, or combination. The drive member engages the one-way clutch and is reciprocated by the up-and-down movement of the handlebars. The invention will be described in this specification with emphasis given to its scooter application.

BACKGROUND OF THE INVENTION

Hand powered vehicles are well represented in the prior art; however, a large percentage of the designs have major flaws which might well prevent their commercial success.

Among the most prevalent of these flaws is the lack of simplicity, which make the cost of these items, most of which might be classified as children's toys, prohibitive. The extra components also require extra energy to operator, especially the reciprocating components, and they add to the weight and upkeep. For instance, U.S. Pat. No. 5,272,928, to Young, U.S. Pat. No. 5,690,346, to Keskitalo, and U.S. Pat. No. 6,554,309, to Thir, all use at least four one-way clutches with associated chains, sprockets, drums, etc. In U.S. Pat. No. 6,557,879, Caldwell uses ten pages of drawings to illustrated his design, and Keskitalo, in U.S. Pat. No. 5,690,346, requires seven pages of drawings. In U.S. Pat. No. 5,050,864, Pertramer discloses a very complicated drive mechanism for a scooter, as does Chait, in U.S. Pat. No. 6,708,997.

Several of the designs appear to have a small enough movement per stroke that a fast stroke cycle is necessary to maintain a reasonable speed. This, in turn, causes an inefficient operation, as the power losses in reversing the reciprocating components increase as the square of the velocity.

For those designs which utilize a spring to rewind one or more one-way clutches on the reverse stroke, the spring is almost always a problem. Providing the necessary distance capacity and strength for the spring is always a challenge, and in several of the designs in the prior art the spring design appears to be inadequate. Patents in this group include U.S. Pat. No. 5,690,346 to Keskitalo, and U.S. Pat. No. 5,272,928 to Young. In contrast, Chait, in his U.S. Pat. No. 6,942,234, shows us return springs which appear adequate, but which will consume a noticeable amount of power.

The steering mechanism is questionable in U.S. Pat. No. 6,942,234, to Chait, which involves tilting the propulsion levers, and U.S. Pat. No. 5,690,346, to Keskitalo, and U.S. Pat. No. 5,272,928, to Young, both utilize a very small pulley on the steering column which is activated by cables, and very likely does not operate properly. It would appear that the design in U.S. Pat. No. 4,109,927, to Harper, would not permit turning of the hand driven crank while in a turning mode.

U.S. Pat. No. 5,282,640, to Lindsey, discloses a scooter that is propelled by back-and-forth reciprocation of a single handlebar. It is doubtful that this will be effective, as the operator is not able to spread his feet front-to-back on the platform in order to exert enough horizontal force on the handlebars. This is in contrast to the present invention, which uses vertical force to operate the mechanism, and the operator can easily apply his weight to the handlebars.

U.S. Pat. No. 2,123,390, to Welch, and U.S. Pat. No. 1,598,855, to Dunlop, operate in a manner similar to the Lindsey design, and would probably present the same problem.

Designs in this field probably have a greater chance of success if they are uncomplicated and have a small number of lightweight reciprocating components.

SUMMARY AND OBJECT OF THE INVENTION

The most notable aspect of this invention is perhaps its simplicity. The basic components comprise only a single one-way clutch, a single idler pulley, a closed loop of drive chain or cable, and a single reciprocating drive lever connected to the drive chain or cable.

This simplicity results in low cost, light weight, easy maintenance, and efficient propulsion. The operator both propels and steers the vehicle with a single set of handlebars which pivot, for steering, about a point close to the axis of the steering column. Steering is comfortable, positive, effective, and very similar to the steering of a conventional bicycle.

Propelling force is delivered during the downward movement of the handlebars in an up-and-down stroke cycle, in which the operator uses his weight as the driving force. Maintaining his balance is not a problem, and the propelling and steering functions work smoothly together.

The use of the operator's weight in the downward movement of the handlebars permits a forceful transfer of energy, and the power stroke is long enough that the vehicle is moved a considerable distance with each stroke. This prevents the excessive loss of energy caused by the large number of reversals of the reciprocating components in most designs of the prior art.

Operation of a vehicle of this invention utilizes many of the major muscle groups of the body: arms, shoulders, legs to lift the body after moving downward to add to the stroke, and particularly, all of the abdominal muscles.

At first glance it would seem that power is applied only one-half the time, but this is not the case. The upward, return stroke of the handlebars is uninhibited and very fast, while the downward power stroke is much slower, resulting in power transfer during about seventy-five percent of the time. The fact that the present design uses only one one-way clutch, and can use all lightweight cable for the drive member, further reduces the power losses from reciprocation of components.

A distinct advantage is offered by the present invention in that it does not require one or multiple rewind springs, as do a large majority of the designs of the prior art. These springs are usually difficult to design properly to fulfill all requirements, and most often require additional reciprocating components.

The present design allows a large and forceful movement of the handlebars with each downward power stroke. This provides a sufficient top speed without the power losses associated with a short stroke and more frequent reversals of the reciprocating components of a system.

An examination of the prior art reveals no designs that show us the above combination of a simple, efficient, lightweight, hand-propelled vehicle with a satisfactory top speed and extremely good steering characteristics.

It is the object of this invention to correct all the shortcomings of comparable designs in the prior art.

DETAILED DESCRIPTION OF THE PREFERRED EMBODIMENT

Figure 1:
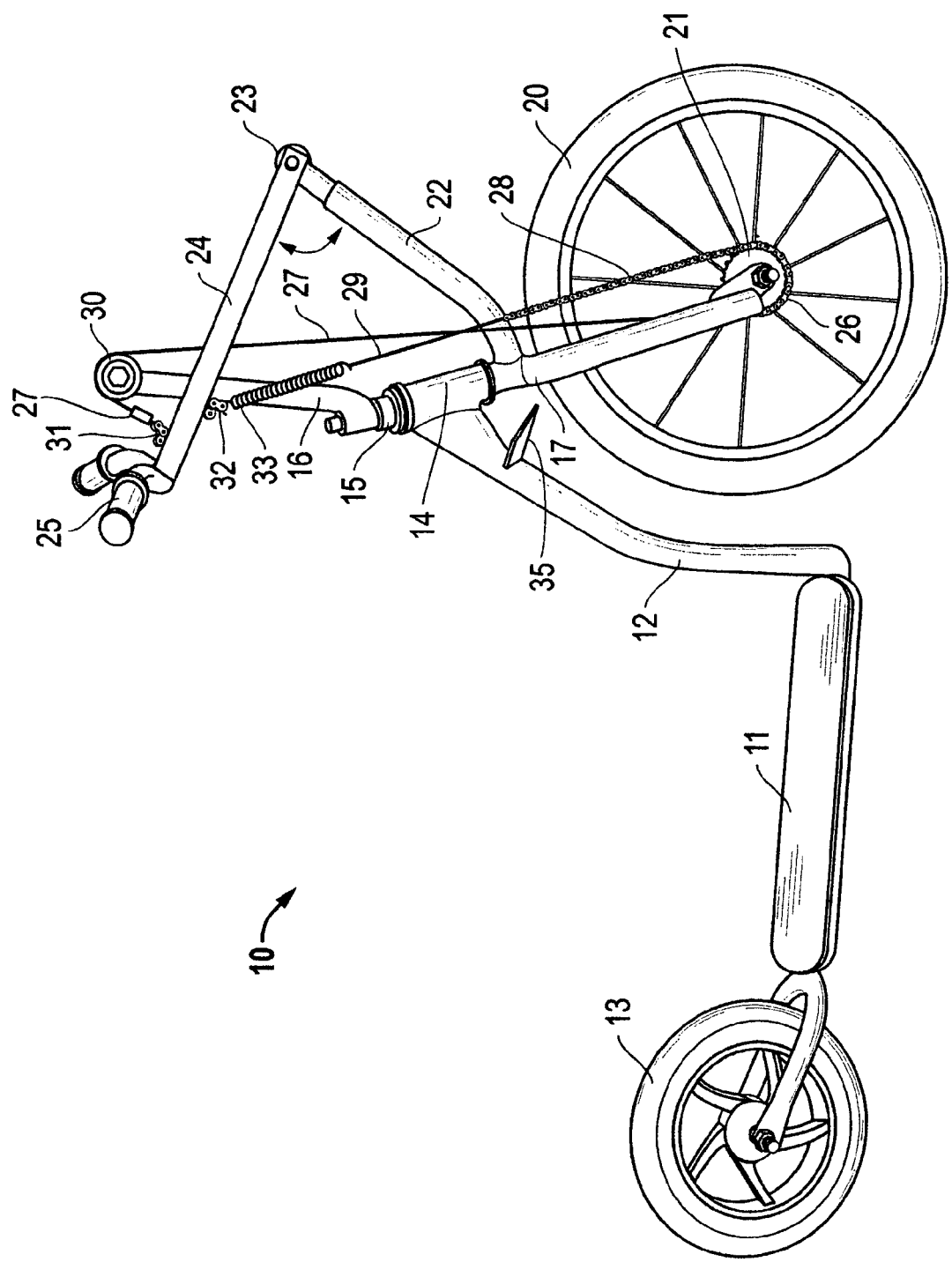
FIG. 1 is a side view of scooter 10, which is propelled and steered by the apparatus of the present invention. The vertically reciprocating handlebars are shown in FIG. 1 at their uppermost position, at the end of the return stroke.

FIG. 1 is a side view of the preferred embodiment of the present invention in a scooter referred to as scooter 10. Floorboard 11 of scooter 10 supports the operator and is attached to framework 12, which rotatably supports rear wheel 13 at its rear portion and is joined to steering column journal means 14 at its upper forward portion. Steering column 15 is rotatably supported by steering column journal means 14, and supports idler pulley mast 16 at its upper end, and fork 17 at its lower end.

Fork 17 rotatably supports front drive wheel 20, which has one-way clutch 21 attached to its hub. Drive/steering level support mast 22 is joined to the forward side of fork 17 close to the point at which it joins steering column 15, and extends upward and forward to a point at which it supports drive/steering lever journal means 23 (refer to FIGS. 3 and 4 also).

Figure 2:
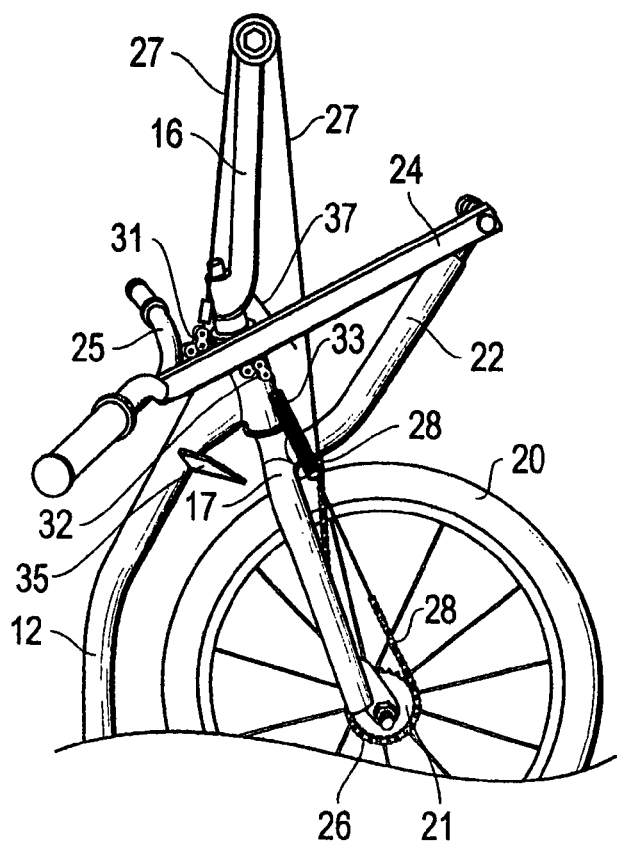
FIG. 2 is a partial side view of scooter 10 with the handlebars at their lowest position, at the end of the power stroke.

Drive/steering level 24 and handlebars 25 are supported for up-and-down movement by drive/steering level journal means 23, and are shown in their uppermost position, after the return stroke, in FIG. 1, and in their lowest position, after the power stroke, in FIG. 2.

One-way clutch 21 comprises a sprocket 26 which turns backward freely and which forces the wheel 20 to turn with it when it is turned in a forward direction. The one-way clutch will not be described in detail because it has been well-known and widely used in the art for some time. The drive medium is a closed loop comprising a combination of cable segments 27 and 29, and roller chain segment 28.

The up-and-down pumping of the handlebars 25 causes a reciprocation of the cable 27 and 29 and chain 28 loop, and the roller chain 28 comprises the portion of the loop which comes in contact with sprocket 26 during this reciprocation. Using cable 27 and 29 for the rest of the loop lowers the weight which is reciprocated and the energy required to reverse its direction constantly. The cable 27 and 29 and chain 28 loop is supported by sprocket 26 at the bottom and idler pulley 30 at the top, and is separated and joined to the top and bottom, respectively, of drive/steering level 24, by means of hingeable connector 31 and hingeable connector 32, which prevent bending wear on cables 27 and 29.

Spring 33 accommodates the slight difference which occurs in the total length of the cable 27 and 29 and chain 28 loop during operation. It is noted that spring 33 is positioned below drive/steering lever 24, in series with cable segment 29, and is not subject to the drive force, which is transmitted by cable 27 which passes over idler pulley 30.

Power to propel scooter 10 is supplied by pressing handlebars 25 downward with the hands, which pulls cable 27 over idler pulley 30 and pulls chain 28 upward on the rearward side of sprocket 26, forcing sprocket 26, one-way clutch 21, and front wheel 20 to revolve in a forward direction.

The return (upward) stroke of handlebars 25 reverses the movement of the cable 27 and 28 and chain 28 segments, with sprocket 26 turning freely to return handlebars 25 to their uppermost position, ready for the next power stroke.

Steering is accomplished by twisting handlebars 25 in an approximately horizontal plane. The force is passed through drive/steering lever 24, drive/steering lever journal means 23, and drive/steering level support mast 22, to control the angular position of fork 17 and front wheel 20. It is noted that handlebars 25 are rotated about an approximately vertical axis which is close to the axis of steering column 15. The result is that the steering is solid, comfortable, and very similar to the steering of a conventional bicycle.

During steering of scooter 10, all of the components connected to steering column 15 pivot together as a unit. Included are fork 17, front wheel 20 and one-way clutch 21 and sprocket 26, drive/steering lever support mast 22, drive/steering lever 24, handlebars 25, idler pulley mast 16, idler pulley 30, cables 27 and 29, and chain 28.

Stop 35 limits the pivoting movement of fork 17 in both directions. Stop 36 (FIGS. 3 and 4) limits the upward movement of drive/steering lever 24, and stop 37 (FIG. 2) limits the downward movement of drive/steering lever 24.

Idler pulley mast 16 does not need to be extremely strong, as the loading is mostly axial, as indicated by the two strands of cable 27 while approach idler pulley 30 from the two respective sides (FIGS. 1 and 2). Also, drive/steering level 24 and drive/steering lever support mast 22 are not highly stressed because handlebars 25 are joined to drive/steering lever 24 very close to the point that cable 27 is joined to drive/steering lever 24.

Scooter 10 requires a braking system, but for simplicity none is shown, as there are a number of braking systems well known in the art which could be added.

FIG. 2 is a partial side view of scooter 10 with handlebars 25 in their lowest position at the end of the downward power stroke. The different locations of chain segment 28 in FIG. 1 and FIG. 2 can be observed, and a careful observation of hingeable connectors 31 and 32 in FIG. 1 and FIG. 2 reveals the change in the angle each makes with drive/steering lever 24 during the stroke. The relative position of the handlebars in the two drawings also indicate the length of the power stroke, which is approximately sixteen inches. This long power stroke provides a maximum input of power because of the decreased number of reversals. The smaller number of reversals also provides a more efficient operation with less power loss.

Figure 3:
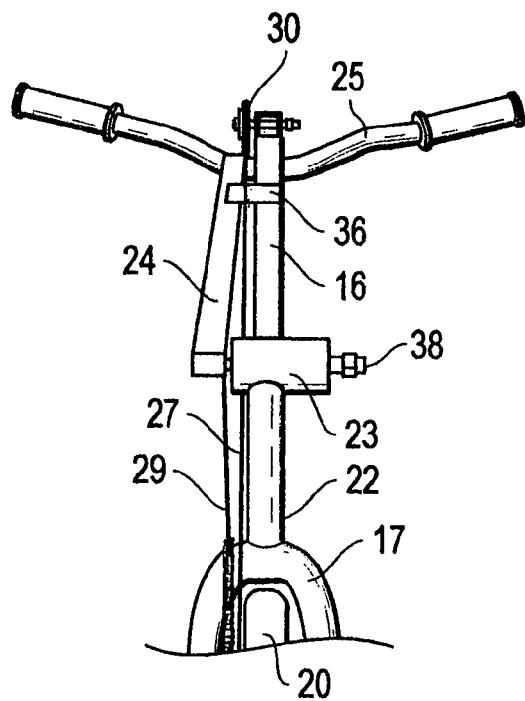
FIG. 3 is a partial front view of scooter 10, which indicates the lateral positioning and relationship of some of the components.

FIG. 3 is a partial front view of scooter 10 with handlebars 25 in their uppermost position. Shaft 38 is rotatably secured in journal means 23 and rigidly attached to drive/steering lever 24. Idler pulley mast 16 is located at least approximately within the vertical front-to-back centerplane of scooter 10, and drive/steering lever 24 is laterally offset approximately one and one-half inches, and connected to handlebars 25 slightly off center.

Figure 4:
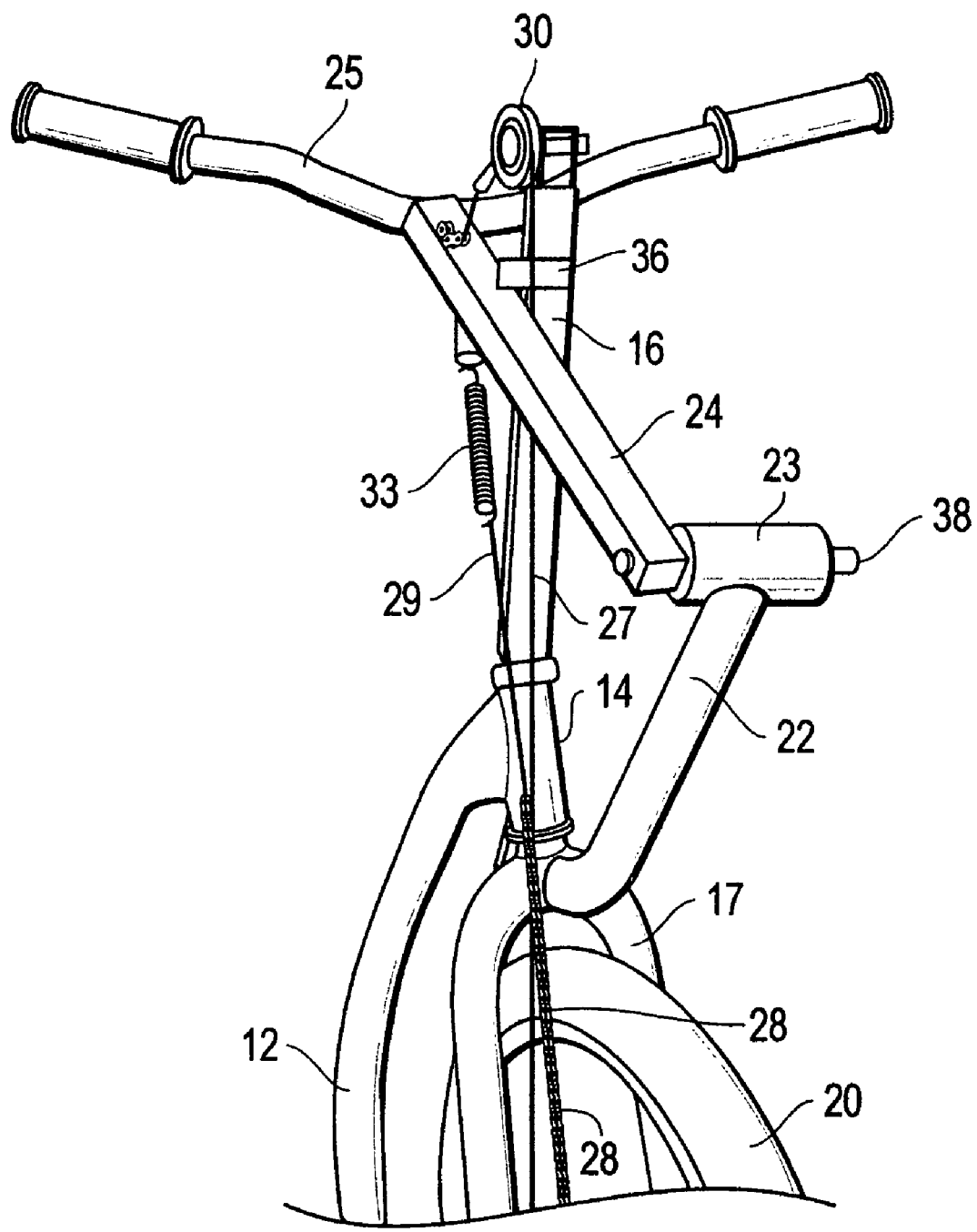
FIG. 4 is a partial oblique frontal view of scooter 10.

FIG. 4 is a partial oblique frontal view of scooter 10 which provides an additional perspective.

I claim:

1. Steering and propulsion means for a hand propelled vehicle having one steerable front wheel and at least one rear wheel, comprising:

vehicle framework means comprising steering column journal means;

steering column means rotatably suspended by said steering column journal means;

fork means forming a downward extension of said steering column means and rotatably securing said front wheel of said vehicle;

said front wheel having a one-way clutch assembly comprising pulley means, mounted upon its hub, the operation of said clutch assembly such that said pulley means rotates freely in a backward direction, and when rotated in a forward direction causes said one-way clutch assembly and said front wheel to rotate in said forward direction;

drive/steering lever support mast joined to the upper end of said fork means and from there extending upwardly and forwardly;

drive/steering lever joined by journal means to the upper/forward end of said drive/steering lever support mast in a manner that causes said drive/steering lever to hinge within a plane parallel to the plane of said front wheel;

handlebars joined rigidly to the rearward end of said drive/steering lever;

idler pulley mast forming an upward extension of said steering column means and having idler pulley means rotatably mounted at its upper portion in an at least almost vertical, and approximately front-to-back, plane;

a tensional flexible drive member in the form of a closed loop, mounted upon said idler pulley means at its upper end, and upon said pulley means of said one-way clutch assembly at its lower end;

a point upon said tensional flexible drive member attached to said drive/steering lever, the location along said tensional flexible drive member of said point such that the downward portion of an up-and-down stroke cycle of said handlebars and said drive/steering lever results in rotation in said forward direction of said pulley means of said one-way clutch assembly, and rotation in said forward direction of said one-way clutch assembly and said front wheel;

and the following upward portion of said up-and-down stroke cycle of said handlebars and said drive/steering lever results in free rotation in said backward direction of said pulley means of said one-way clutch assembly, along with possible continued forward rotation of said one-way clutch assembly and said front wheel.

2. A vehicle having one steerable, hand propelled front wheel with one-way clutch assembly which comprises pulley means, operably attached to its hub, the operation of said one-way clutch assembly such that said pulley means revolves freely in a rearward direction, and when revolved in a forward direction causes said one-way clutch assembly and said front wheel to revolve in said forward direction;

said vehicle having framework means which rotatably supports at least one rear wheel and which rotatably supports steering column means;

said steering column means joined at its lower end to fork means which rotatably supports said front wheel, and to a drive/steering level support mast which extends upwardly and forwardly;

a drive/steering lever supported by journal means at the upper/forward end of said drive/steering lever support mast and extending to the rear, where it rigidly supports handlebars, said journal means arranged so that said drive/steering lever hingeably moves within a plane which is parallel to the plane of said front wheel;

idler pulley mast forming an upward extension of said steering column means and rotatably supporting idler pulley means as its upper portion in an at least almost vertical plane;

a tensional flexible drive member in the form of a closed loop, operably joining said idler pulley means and said pulley means of said one-way clutch assembly, and attached to said drive/steering lever at a point along said tensional flexible drive member such that the downward portion of an up-and-down stroke cycle of said handlebars and said drive/steering lever causes said pulley means of said one-way clutch assembly, said one-way clutch assembly, and said front wheel to rotate in said forward direction.

3. Steering and front wheel propulsion means for a hand propelled vehicle having one steerable front wheel and at least one rear wheel, comprising:

fork means rotatably supporting said front wheel;

steering column means forming an upward extension of said fork means along the substantially vertical axis of said fork means;

steering column journal means secured by framework means of said vehicle and arranged to rotatably support said steering column means;

drive/steering lever support mast rigidly attached at least approximately at the point where said fork means and said steering column means are joined, and extending from that point forwardly and upwardly;

a drive/steering lever journal at the upper, forward end of said drive/steering lever support mast which supports said drive/steering lever in a manner that permits said drive/steering lever to hingeably swing within a plane which is parallel to the plane of said front wheel;

handlebars rigidly attached to the rearward end of said drive/steering lever;

whereas steering force, entered as a twisting of said handlebars about an approximately vertical axis, is passed through said drive/steering lever, said drive/steering lever journal, and said drive/steering lever support mast, to be applied to said fork means to control the angular location of said fork means and said front wheel;

one-way clutch assembly mounted upon the hub of said front wheel, said one-way clutch assembly having pulley means to operably engage a tensional flexible drive member;

said one-way clutch assembly constructed so that when said pulley means is rotated in a forward direction, said one-way clutch assembly, and said front wheel, must turn with it, and when said pulley means is rotated in a rearward direction, it moves freely with respect to said one-way clutch assembly and said front wheel;

idler pulley mast joined rigidly to the upper portion of said steering column means and extending at least approximately vertically;

idler pulley means rotatably secured in an at least approximately vertical plane at the upper portion of said idler pulley mast;

said tensional flexible drive member, in the form of a closed loop, mounted upon said idler pulley means at its upper portion and upon said pulley means of said one-way clutch assembly at its lower portion;

a point near the upper end of said closed loop of said tensional flexible drive member joined to said drive/steering lever, to cause said closed loop of said tensional flexible drive member to reciprocate in response to up-and-down movement of said handlebars and said drive/steering lever, said point located on the section of said closed loop of said tensional flexible drive member which leads directly to the forward side of said pulley means of said one-way clutch assembly;

whereby downward movement of said handlebars and said drive/steering lever causes rotation in said forward direction of said pulley means, said one-way clutch assembly, and said front wheel, and subsequent upward movement of said handlebars produces said rearward free rotation of said pulley means.

4. The steering and propulsion means of claim 1, in which said pulley means of said one-way clutch assembly comprises cable drum means having multiple grooves, said idler pulley means comprises a single grooved pulley, and said tensional flexible drive member comprises steel cable means with multiple wraps upon said cable drum means, said steel cable means joined to said cable drum means at one point.

5. The steering and propulsion means of claim 1, in which said pulley means of said one-way clutch assembly comprises sprocket means, said idler pulley means comprises a single grooved pulley, and said tensional flexible drive member comprises roller chain in its segment which operably engages said sprocket means during said up-and-down stroke cycle of said handlebars, and comprises steel cable means in the remainder of said closed loop of said tensional flexible drive member.

6. The steering and propulsion means of claim 1, in which said tensional flexible drive member connects the rearward side of said idler pulley means with the forward side of said pulley means of said one-way clutch assembly, and connects the forward side of said idler pulley means with the rearward side of said pulley means of said one-way clutch assembly.

7. The steering and propulsion means of claim 1, in which said tensional flexible drive member is parted at a location near said drive/steering lever, the two ends connected respectively to hingeable connectors on the top, and on the bottom, of said drive/steering lever.

8. The steering and propulsion means of claim 7, in which said hingeable connectors on the top, and on the bottom, respectively, of said drive/steering lever, are located in slightly separated front-to-back vertical planes.

9. The steering and propulsion means of claim 1, in which a tensional resilient member is positioned in series within the section of said closed loop of said tensile flexible drive member which connects said drive/steering lever directly to said pulley means of said one-way clutch assembly.

10. The steering and propulsion means of claim 1, in which said idler pulley mast is tilted forward of the upward extension of the axis of said steering column means.

11. The steering and propulsion means of claim 1, in which the downward force exerted upon said idler pulley mast by said idler pulley means is approximately along the axis of said idler pulley mast.

12. The steering and propulsion means of claim 1, in which said drive/steering lever is at least approximately horizontal at the center of its said up-and-down stroke cycle.

13. The steering and propulsion means of claim 1, in which said plane in which said drive/steering lever hinges is laterally offset from the vertical centerplane of said hand propelled vehicle.

14. The steering and propulsion means of claim 1, in which a vertical line through the center of said handlebars is near the substantially vertical axis of said steering column means.

15. The steering and propulsion means of claim 1, in which said idler pulley mast comprises stops to limit the upward and the downward movement of said drive/steering lever.

16. The steering and propulsion means of claim 1, in which said framework means comprises stops to contact said fork means and limit its rotation to the right and to the left.

17. The steering and propulsion means of claim 1, in which said front wheel of said vehicle is of a larger size than said at least one rear wheel.

* * * * *